United States Patent
Creed et al.

(10) Patent No.: US 12,358,474 B1
(45) Date of Patent: Jul. 15, 2025

(54) COMMUNICATION SYSTEM TO TRANSFER DATA BETWEEN VEHICLES

(71) Applicants: Russell Creed, West Hartford, CT (US); David F. Bailey, Riverview, FL (US)

(72) Inventors: Russell Creed, West Hartford, CT (US); David F. Bailey, Riverview, FL (US)

(73) Assignee: CREED 2.0 LLC, New Britain, CT (US)

( * ) Notice: Subject to any disclaimer, the term of this patent is extended or adjusted under 35 U.S.C. 154(b) by 0 days.

(21) Appl. No.: 18/445,041

(22) Filed: Mar. 13, 2023

Related U.S. Application Data

(63) Continuation of application No. 17/300,281, filed on May 10, 2021.

(51) Int. Cl.
| | |
|---|---|
| B60T 7/12 | (2006.01) |
| B60D 1/62 | (2006.01) |
| B60Q 5/00 | (2006.01) |
| B60Q 9/00 | (2006.01) |
| B60T 7/20 | (2006.01) |
| B60T 8/17 | (2006.01) |
| B60T 8/18 | (2006.01) |
| B60T 17/22 | (2006.01) |
| B60K 35/22 | (2024.01) |
| B60K 35/28 | (2024.01) |

(52) U.S. Cl.
CPC ............... *B60T 7/20* (2013.01); *B60D 1/62* (2013.01); *B60Q 5/005* (2013.01); *B60Q 9/00* (2013.01); *B60T 7/12* (2013.01); *B60T 8/1701* (2013.01); *B60T 8/1708* (2013.01); *B60T 8/1887* (2013.01); *B60T 17/221* (2013.01); *B60K 35/22* (2024.01); *B60K 35/28* (2024.01); *B60K 2360/16* (2024.01); *B60T 2250/00* (2013.01); *B60T 2260/09* (2013.01); *B60T 2270/406* (2013.01); *B60T 2270/413* (2013.01)

(58) Field of Classification Search
CPC . B60T 7/12; B60T 7/20; B60T 8/1701; B60T 8/1708; B60T 8/1887; B60T 8/323; B60T 2260/09
USPC ..................................................... 701/70–81
See application file for complete search history.

(56) References Cited

U.S. PATENT DOCUMENTS

| | | | |
|---|---|---|---|
| 9,694,712 B2* | 7/2017 | Healy | B60L 50/53 |
| 2017/0197505 A1* | 7/2017 | Ferguson | B60K 23/08 |
| 2018/0047218 A1* | 2/2018 | Della Monica | G07C 5/0808 |
| 2019/0210418 A1* | 7/2019 | Hall | B60W 30/00 |
| 2021/0323519 A1* | 10/2021 | Robertson | B60T 8/172 |
| 2023/0365209 A1* | 11/2023 | Yang | B60L 15/2036 |

* cited by examiner

Primary Examiner — Erick R Solis
(74) Attorney, Agent, or Firm — Arthur W. Fisher, III

(57) ABSTRACT

A communication system to transfer data between a towing vehicle and a towed vehicle including data of selected vehicle control network operating parameters generated in a towed vehicle, through a microcontroller to a remote monitor or display in the towing vehicle to show and alert the status of selected operating parameters of the towed vehicle when in tow.

18 Claims, 14 Drawing Sheets

COMMUNICATION SYSTEM TO TRANSFER DATA BETWEEN VEHICLES

CROSS REFERENCE

This is a continuation application of utility application Ser. No. 17/300,2812, filed May 10, 2021.

BACKGROUND OF THE INVENTION

Field of the Invention

A communication system to transfer data between a towing vehicle and a towed vehicle.

Description of the Prior Art

Often recreational vehicles, motor homes, trucks, and the like tow a smaller vehicle hitched thereto. The combined weight of the towing vehicle and towed vehicle creates a dangerous braking condition when using only the towed vehicle brake system.

This increased mass impacts both the stopping distances and time, as well as creates excessive wear on the brakes of the towing vehicle. Further, the mechanical connection between the towing vehicle and the towed vehicle is overly stressed.

Furthermore, ABS systems present a contamination problem when being towed. These ABS systems are rendered inoperative when the fluid level decreases. As such, these ABS brake systems can cause faults in their computer programs and operation of the brake and traction systems.

The prior art has sought to remedy this problem. In one such remedy, each time a vehicle is to be towed, a device is inserted into that vehicle to operate its braking system, or to substitute for its braking system. The device is then connected to the braking system of the towing vehicle through hydraulic, high pressure air, or vacuum lines. Though more effective than having no contribution to overall braking from the towed vehicle, these remedies rarely approach the ideal, in which no additional load is placed on the towing vehicle's brakes. Further, in order to independently operate the towed vehicle, the installed braking device must be removed, as well as the hydraulic, air or vacuum lines. The inconvenience of repeatedly installing and removing braking devices and cumbersome lines has limited the acceptance of these types of prior art systems. Additionally, the required connection and disconnection may result in air or other contamination of the closed brake systems, rendering them inoperative.

U.S. Pat. No. 6,501,376 describes an apparatus for data exchange between a towing vehicle and towed vehicle comprising transmission/receiving modules in both vehicles to recognize that the vehicles and operatively connected. The transmission/receiving module of the towing vehicle transmits an identification signal and changes the electrical status connection line between the vehicles. If the transmission/receiving module located in the towed vehicle recognizes the change in the electrical status simultaneously with receiving the transmitted identification signal, the identification signal is stored within the towed vehicle. In subsequent communications between the vehicles the identification signal transmitted before the message allowing communication between the vehicles.

U.S. Pat. No. 6,608,554 relates to an apparatus to provide data communications associated with a heavy duty vehicle comprising at least one electronic subsystem associated with the heavy duty vehicle and a plurality of electrical conductors connected to the at least one electronic subsystem and associated with the heavy duty vehicle. A vehicle data communications protocol converter is connected to the plurality of electrical conductors for converting a first data communications protocol associated with data communications along the plurality of electrical conductors to a second data communications protocol such as an infrared or an RF data communications protocol. The apparatus also includes a transceiver connected to the data communications protocol converter for transmitting the second data communications protocol from the heavy duty vehicle and receiving the data communications protocol from a remote data communications terminal.

US 2005/0225169 shows a braking device comprising a brake actuator, a controller and a voltage regulator system to monitor the energy level of the towed vehicle battery.

US 2013/0158826 shows a braking assistance system for a vehicle towed comprising at least one sensor coupled to the towed vehicle to detect information about at the towed vehicle and the towing vehicle and an electronic control unit having a processor. The electronic control unit communicates with the sensor to receive status information regarding the vehicles. The processor is configured to determine an electrical connection between the vehicles determine a deceleration of the vehicles based on the information from the at least one sensor, identify a brake assist situation, and initiate a brake control operation to control braking of the towed vehicle during the brake assist situation.

US 2003/0168908 relates to a brake controller for controlling the brakes of a towed vehicle having a control module and a power module. The control module is mounted in the cab of a towing vehicle comprising an accelerometer to read acceleration forces in at least two axes and a microprocessor which polls the accelerometer and sends braking information to the power module. The control module includes a gain control to adjust the amount of brake force information, a manual braking lever and a display panel. The power module receives the braking information from the control module and secures power to actuate the brakes.

U.S. Pat. No. 6,609,766 shows a progressive and proportional braking system for use with a towed vehicle. Utilizing the towed vehicle's existing vacuum power assisted braking system.

U.S. Pat. No. 8,430,458 discloses an auxiliary braking system located in a towed vehicle for braking the towed vehicle including a remote control to selectively communicate with an auxiliary braking unit in a towing vehicle. The auxiliary braking system allows the operator of the towing vehicle to assess the functioning of the auxiliary braking unit. In addition, the operator is able to remotely effect real time adjustments to the performance parameters of the auxiliary braking system while driving.

US 2006/0071549 relates to an electronic controlled vacuum powered brake system for a towed vehicle such as a boat, horse, travel, fifth wheel and utility trailers. Comprising a vacuum power assisted master cylinder with two outlet ports of hydraulic power, a vacuum pump, a solenoid, an electronic power module, and a dash control module. The power brake unit is directly connected by lever arm to the solenoid of the towed vehicle.

U.S. Pat. No. 6,609,766 describes a braking system for a towing vehicle and a towed vehicle wherein the towing vehicle's brake system sends an electronic relay to the towed vehicle's brake system to apply the brakes of the towed vehicle at the proper rate of deceleration.

US 2004/0160117 shows an auxiliary braking apparatus configured for use with a towed vehicle. Configuring a solid-state inertia device to sense changes in inertia attributable to the braking of the towing vehicle. The auxiliary braking apparatus includes a reservoir constructed from a two-step injection molding process thereby lowering overall manufacturing costs of the braking apparatus as well as improving the ability of the reservoir to be directly mounted to the housing of the braking apparatus.

U.S. Pat. No. 6,126,246 relates to towed vehicle braking systems including a compressor to drive a fluid actuator with a piston attached to the towed vehicle's brake actuator, e.g., a brake pedal or hand grip. The braking system is actuated by either a towed vehicle velocity decrease sensor, a separation of the towed vehicle and the towing vehicle sensor and/or coded signals from a radio transmitter operated by the driver of the towing vehicle to control the braking system of the towed vehicle.

U.S. Pat. No. 6,631,636 shows a device for testing the hydraulic brake system of motor vehicles for the presence of small and extremely small leaks comprising a loading rod including a non-rotating extendable spindle and measuring head.

While some of the prior art may contain some similarities relating to the present invention, none of them teach, suggested or include all of the advantages and unique features of the invention disclosed hereafter.

SUMMARY OF THE INVENTION

The present invention relates to a communication system to transfer data between a towed vehicle and a towing vehicle such as an RV or recreational vehicle. The vehicles may be coupled together using a tow bar and a hard wire cable harness or two-way radio communications through a towing vehicle module mounted in the cab of the towing vehicle and a towed vehicle module mounted in the cab of the towed vehicle.

The towing vehicle module comprises a microcontroller and a communications section to receive data signals from the towed vehicle. The microcontroller includes logic and circuitry to translate or convert the incoming data signals into operating signals to be displayed on a monitor.

The towed vehicle module comprises a microcontroller to receive operating signals corresponding to a plurality of operating conditions to be displayed from a towed vehicle self-diagnostic device. The microcontroller includes logic and circuitry to translate or convert the operating signals to data signals for transmission to the towing vehicle module.

The predetermining operating conditions of the towed vehicle are sensed by corresponding sensors capable of generating operating signals fed from a towed vehicle control unit through a self-diagnostic device to the microcontroller for conversion to the data signals for transmission to the towing vehicle module either through the tow bar and hard wire cable harness or two-way radio communication.

In operation, various operating conditions or parameters of the towed vehicle are fed to the self-diagnostic device for conversion to corresponding data signals fed to the towing vehicle to be converted to corresponding operating signals representative of the preselected operating conditions of the towed vehicle for display. These operating conditions or parameters may include a braking event, a brake away or vehicle separation event, tire pressure, battery charge and transmission temperature. In addition, the braking, tail light and turn signal functions may be transmitted from the towing vehicle module to the towed vehicle module.

The invention accordingly comprises the features of construction, combination of elements, and arrangement of parts which will be exemplified in the construction hereinafter set forth, and the scope of the invention will be indicated in the claims.

BRIEF DESCRIPTION

For a fuller understanding of the nature and object of the invention, reference should be had to the following detailed description taken in condition with the accompanying drawings in which.

Figure 4:
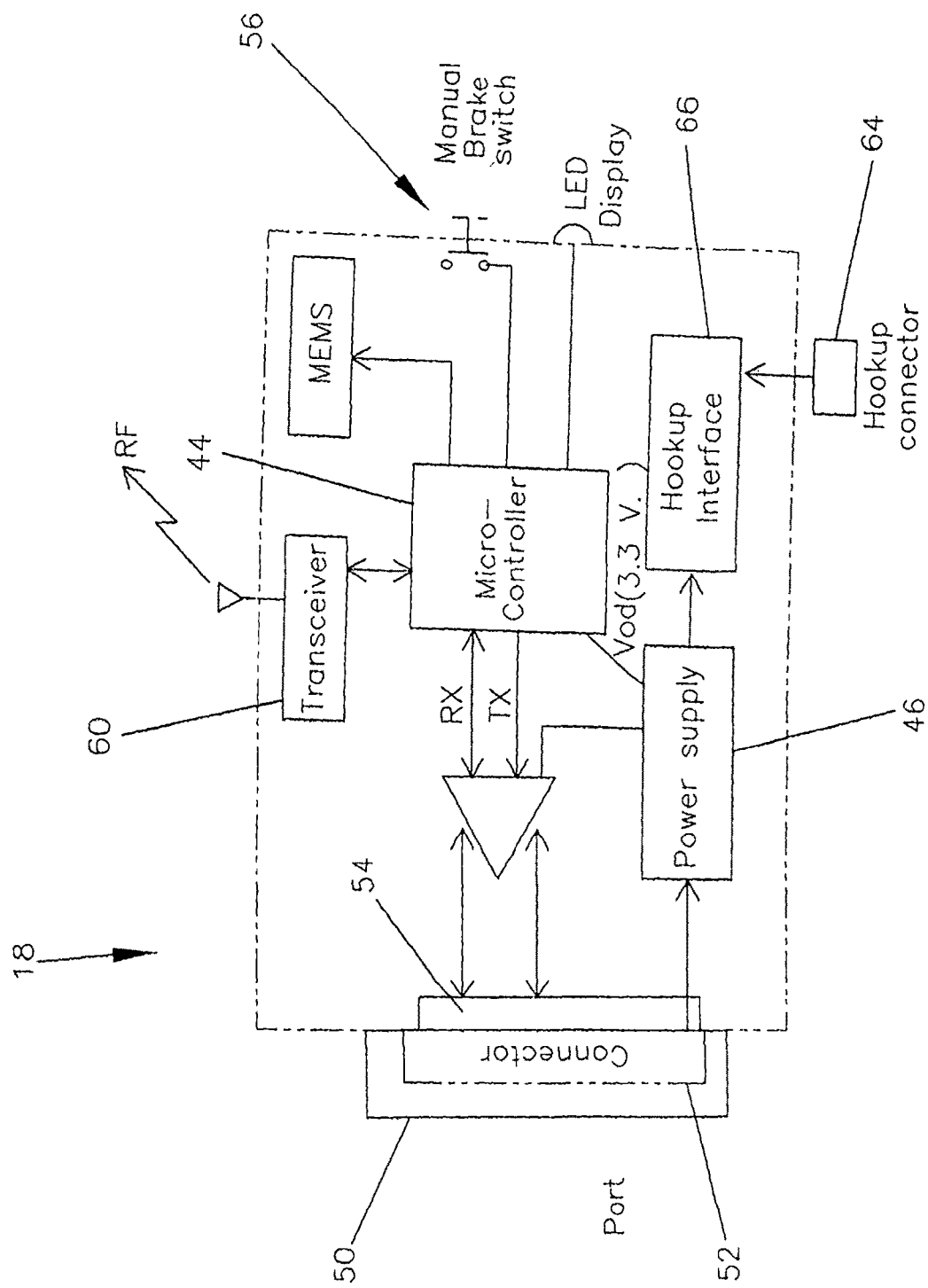

FIG. 4 depicting the components of the module of the communication system of the present invention of the towed vehicle.

Figure 5:
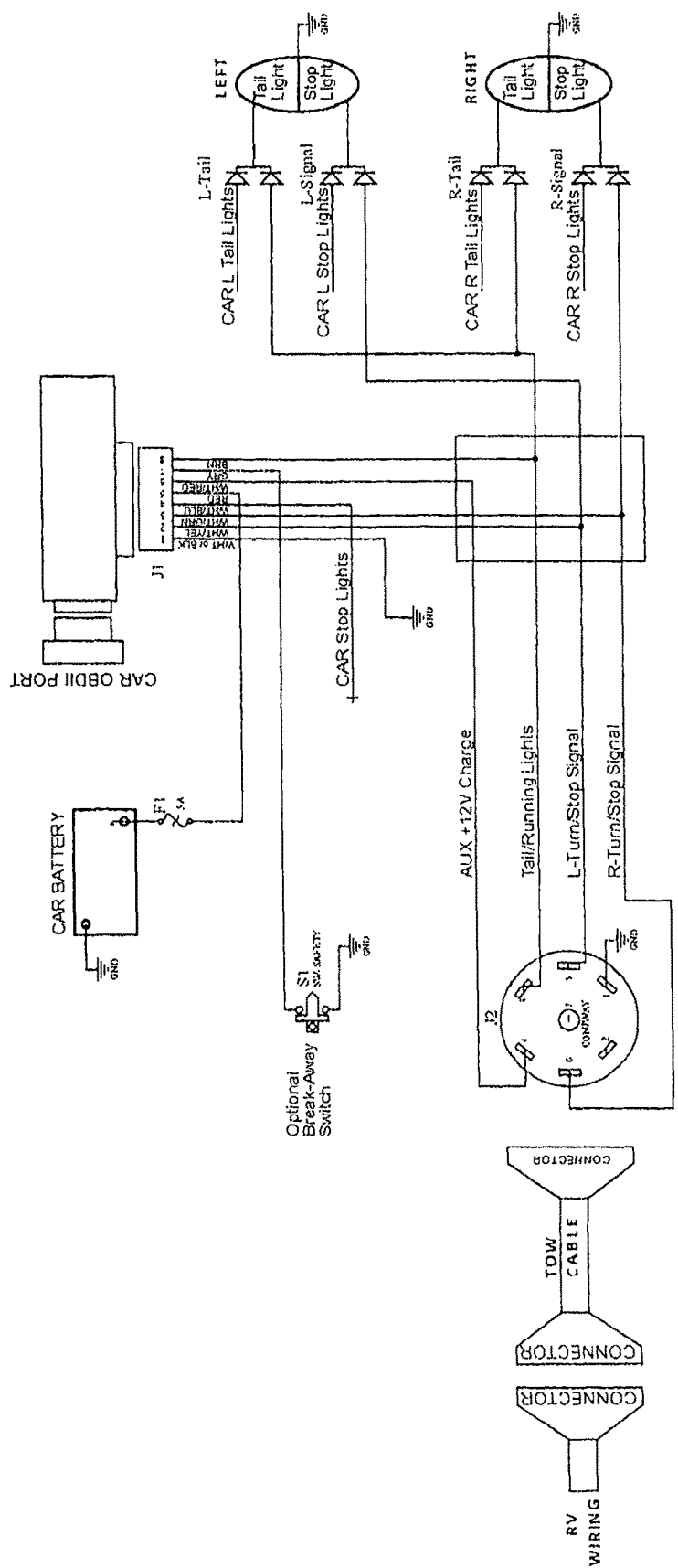

FIG. 5 is a wiring diagram of the towed vehicle connected to the cable harness of the communication system of the present invention.

Figure 6:
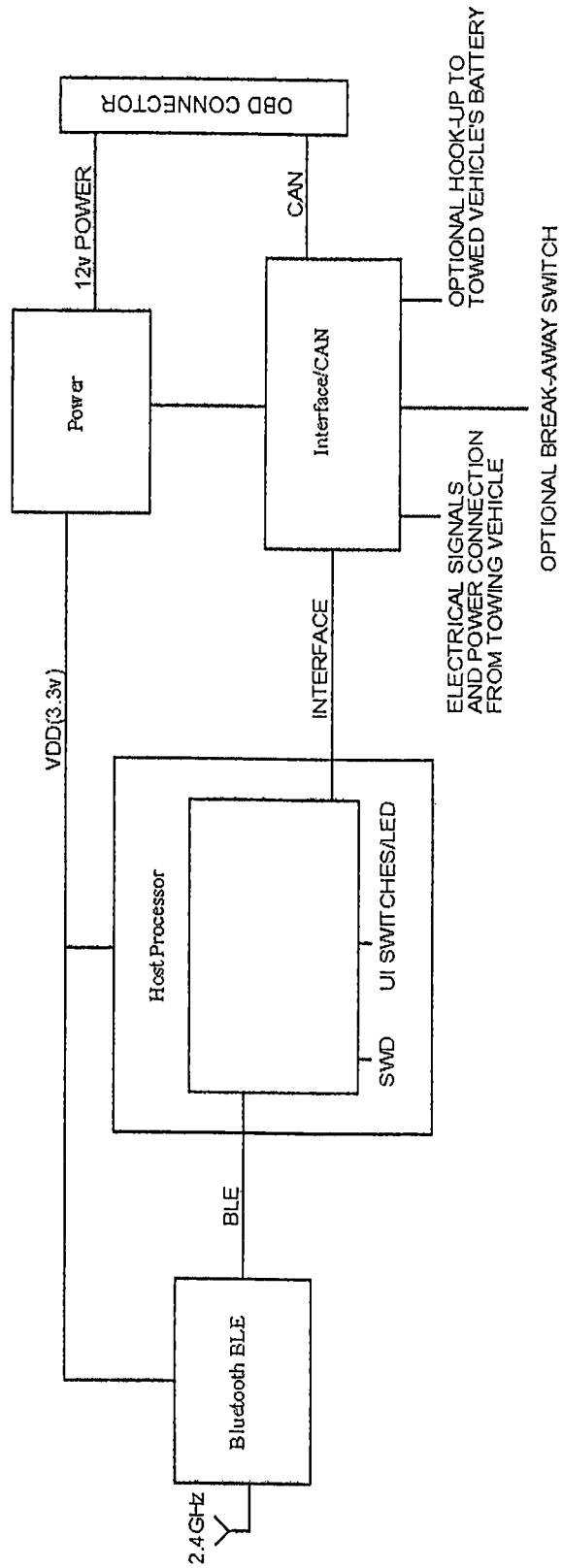

FIG. 6 is a block diagram of the circuitry of the towed vehicle module of the communication system of the present invention.

Figure 7:
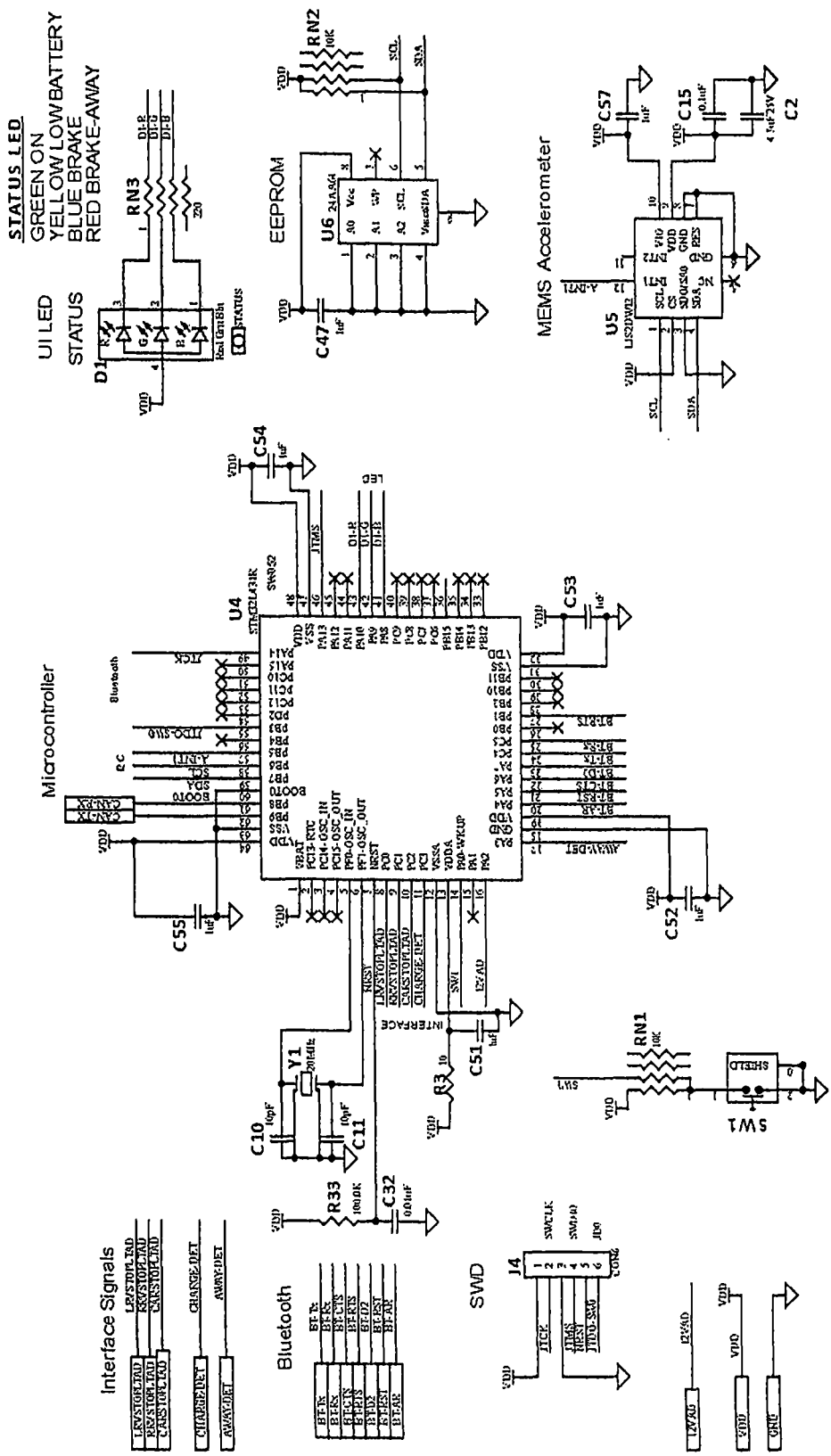

FIG. 7 is a schematic diagram of the microcontroller circuitry of the communication system of the towed vehicle module of the present invention.

Figure 8:
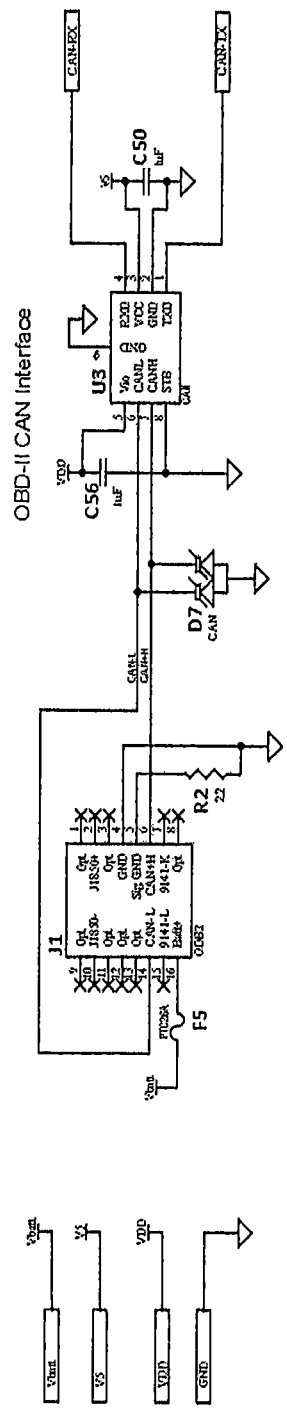

FIG. 8 is a schematic diagram of the interface circuitry of the communication system of the towing vehicle and towed vehicle of the present invention.

Figure 9:
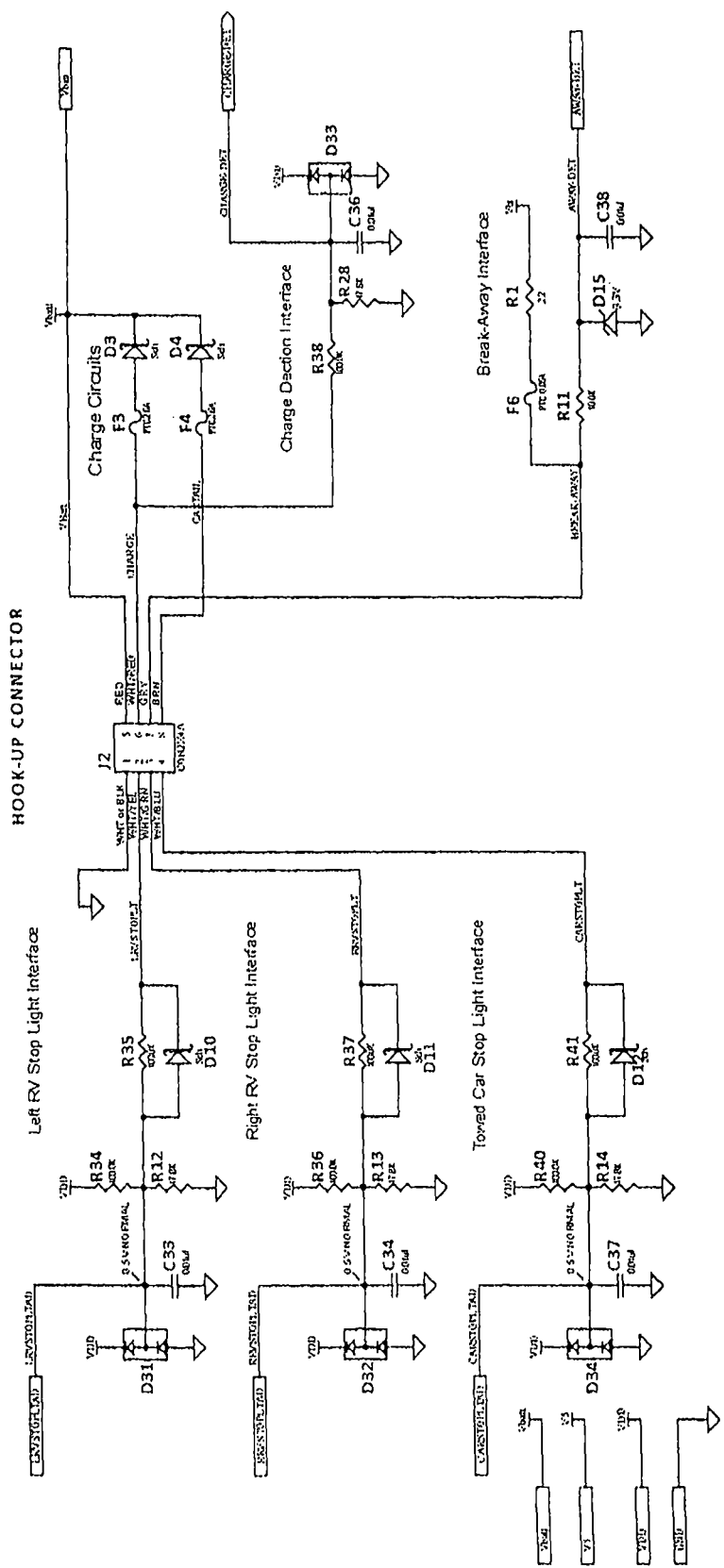

FIG. 9 is a schematic diagram of the hook-up connection circuitry of the communication system of the present invention.

Figure 10:
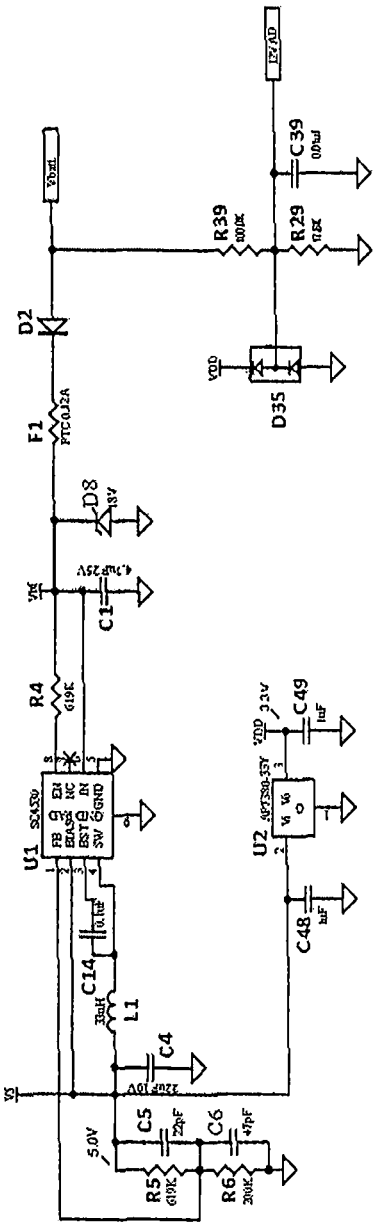

FIG. 10 is a schematic diagram of the power management circuitry of the communication system of the present invention.

Figure 11:
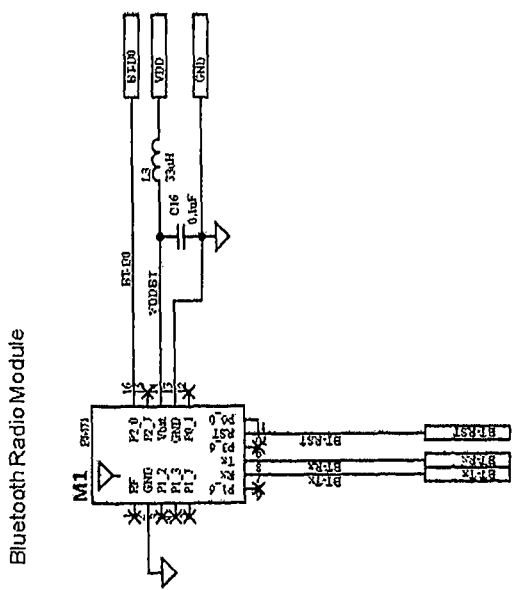

FIG. 11 is a schematic diagram of the Bluetooth circuitry of the communication system of the present invention.

Figure 12:
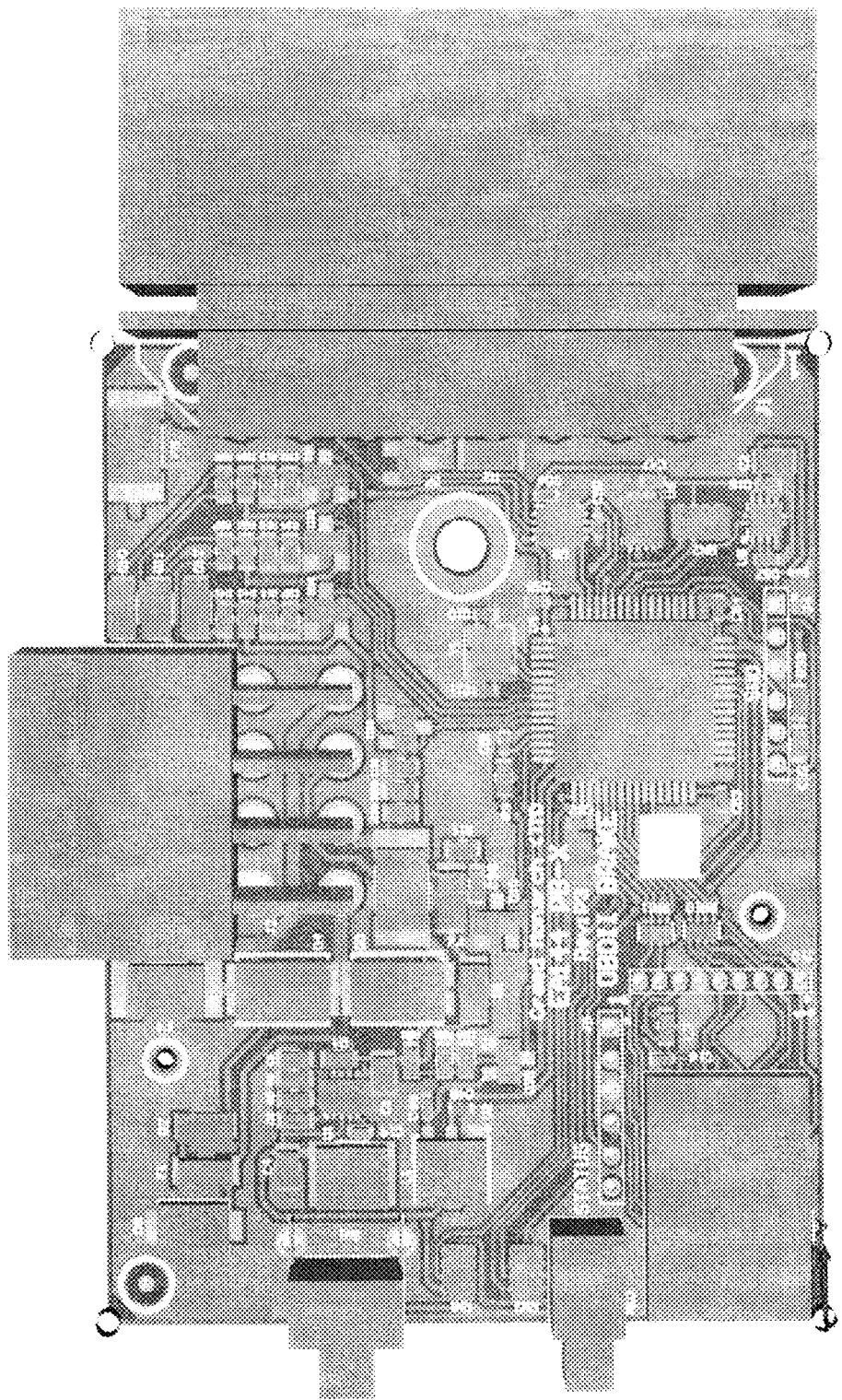

FIG. 12 is a top view of the printed circuit board of the communication system of the present invention.

Figure 13:
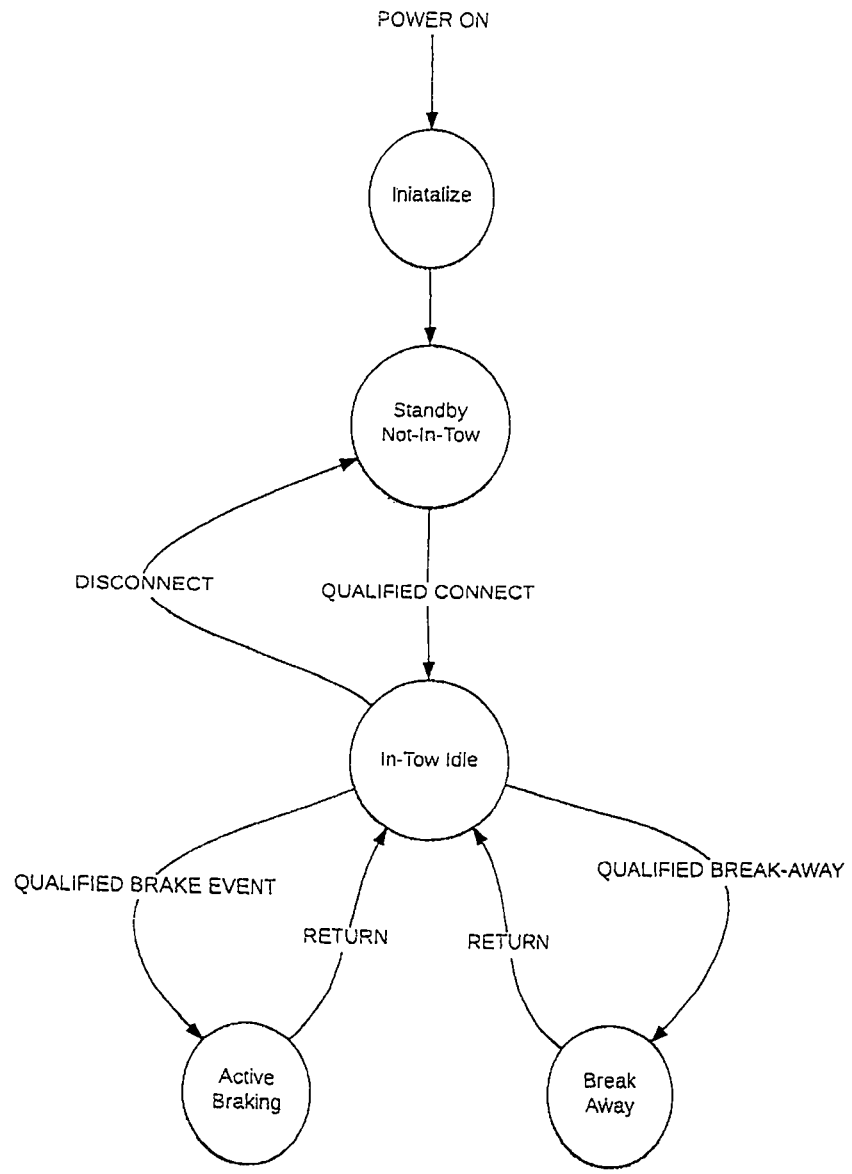

FIG. 13 is a state diagram of the communication system of the present invention.

Figure 14:
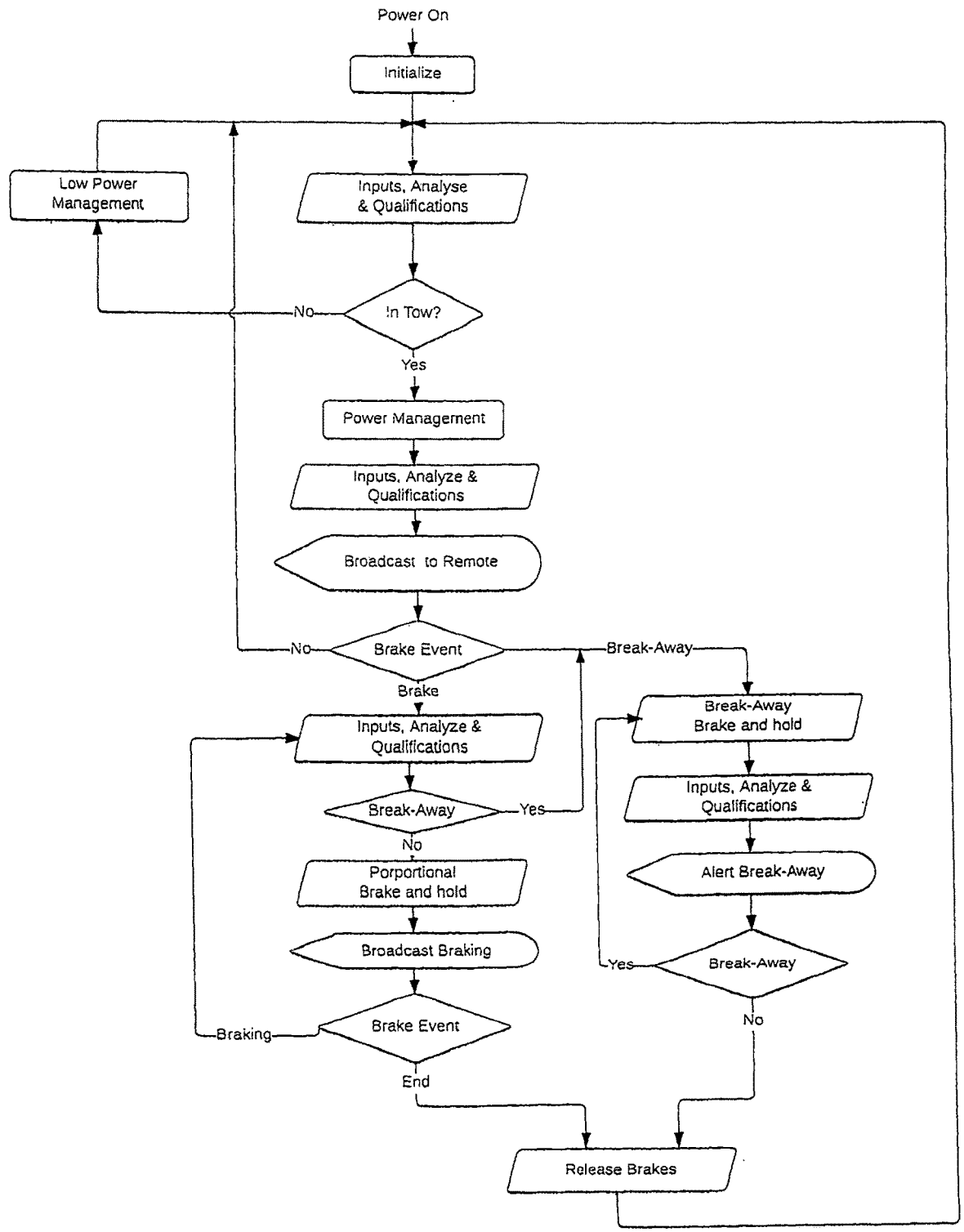

FIG. 14 is a flow chart of the communication system of the present invention.

Similar reference characters refer to similar parts throughout the several views of the drawings.

DETAILED DESCRIPTION OF THE INVENTION

The present invention relates to a communication system to transfer data signals from a towed vehicle 10 to a towing vehicle 12 such as an RV or recreational vehicle. The data signals transmitted from the towed vehicle 10 to the towing vehicle 12 represent the operational condition of predetermined or selected parameters sensed by a vehicle self-diagnostic device of the towed vehicle 10 when in tow.

Figure 1:
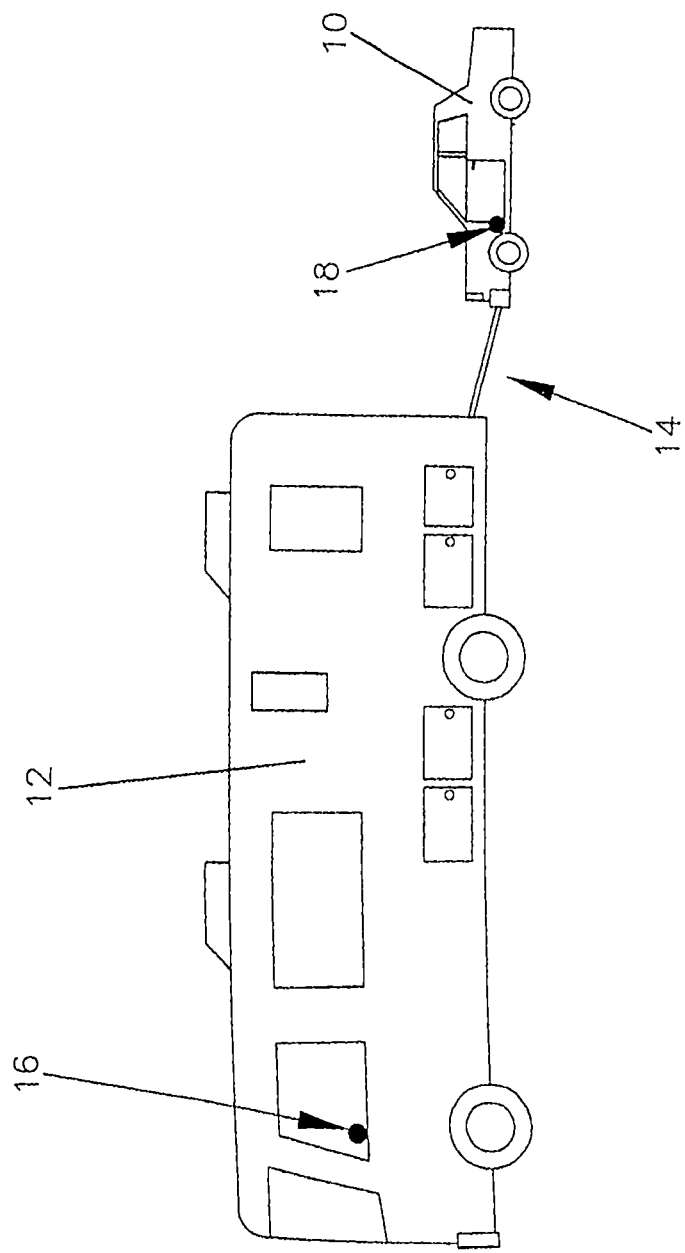
FIG. 1 is a side view of a towing vehicle and towed vehicle including the communication system of the present invention.

The data sensed may be transferred over a tow bar and a hard wire cable harness generally indicated as 14 or through radio frequency transmission to transfer or feed the data signals from a towed vehicle module generally indicated as 18 mounted in the cab of the towed vehicle 10 to a towing vehicle module generally indicated as 16 mounted in the cab of the towing vehicle 12 (FIG. 1).

Figure 2:
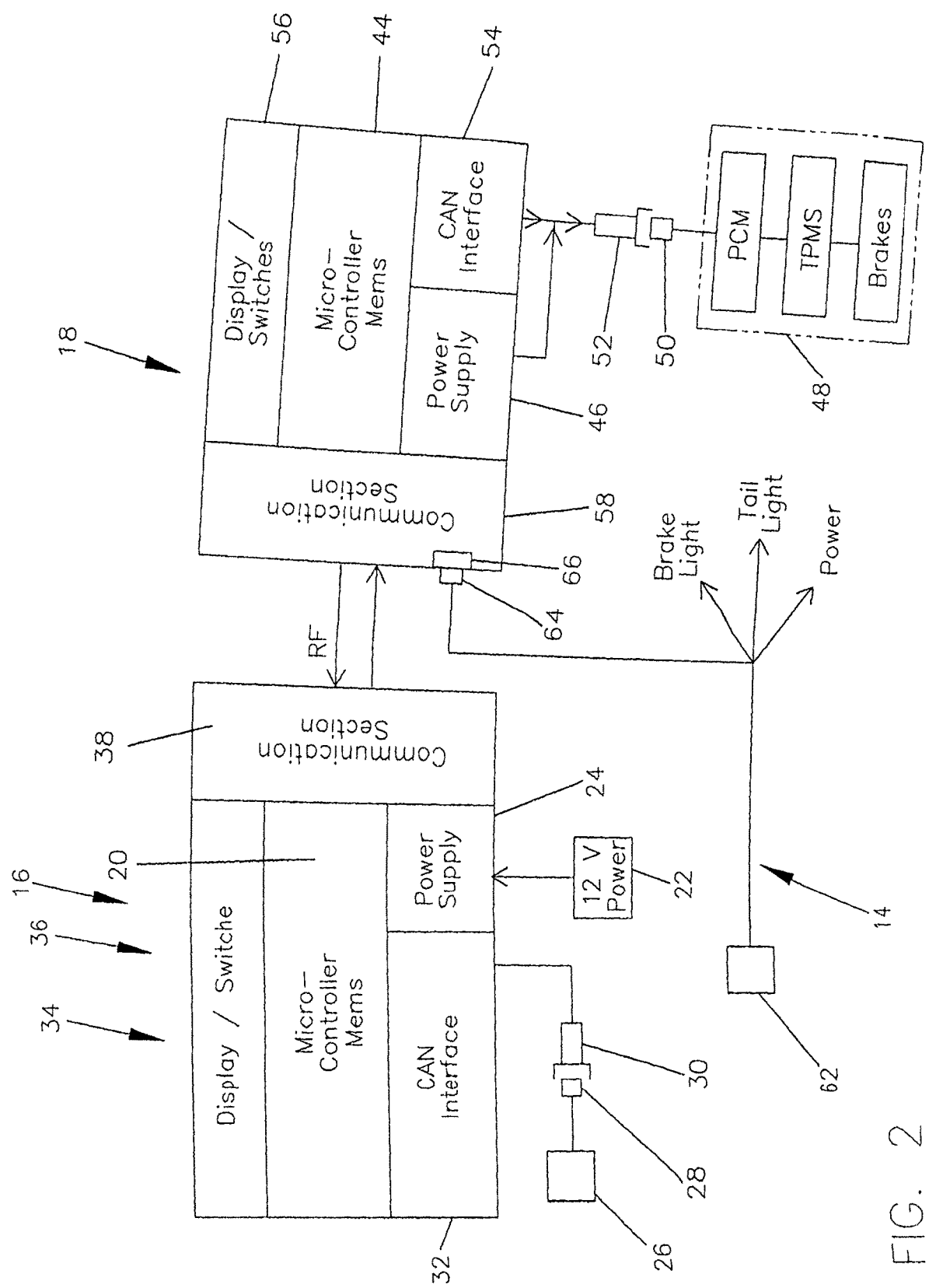
FIG. 2 is a diagram depicting the components of the modules of the communication system of the present invention.

FIG. 2 depicts the major components of the towing vehicle module 16 and the towed vehicle module 18 in block form.

Figure 3:
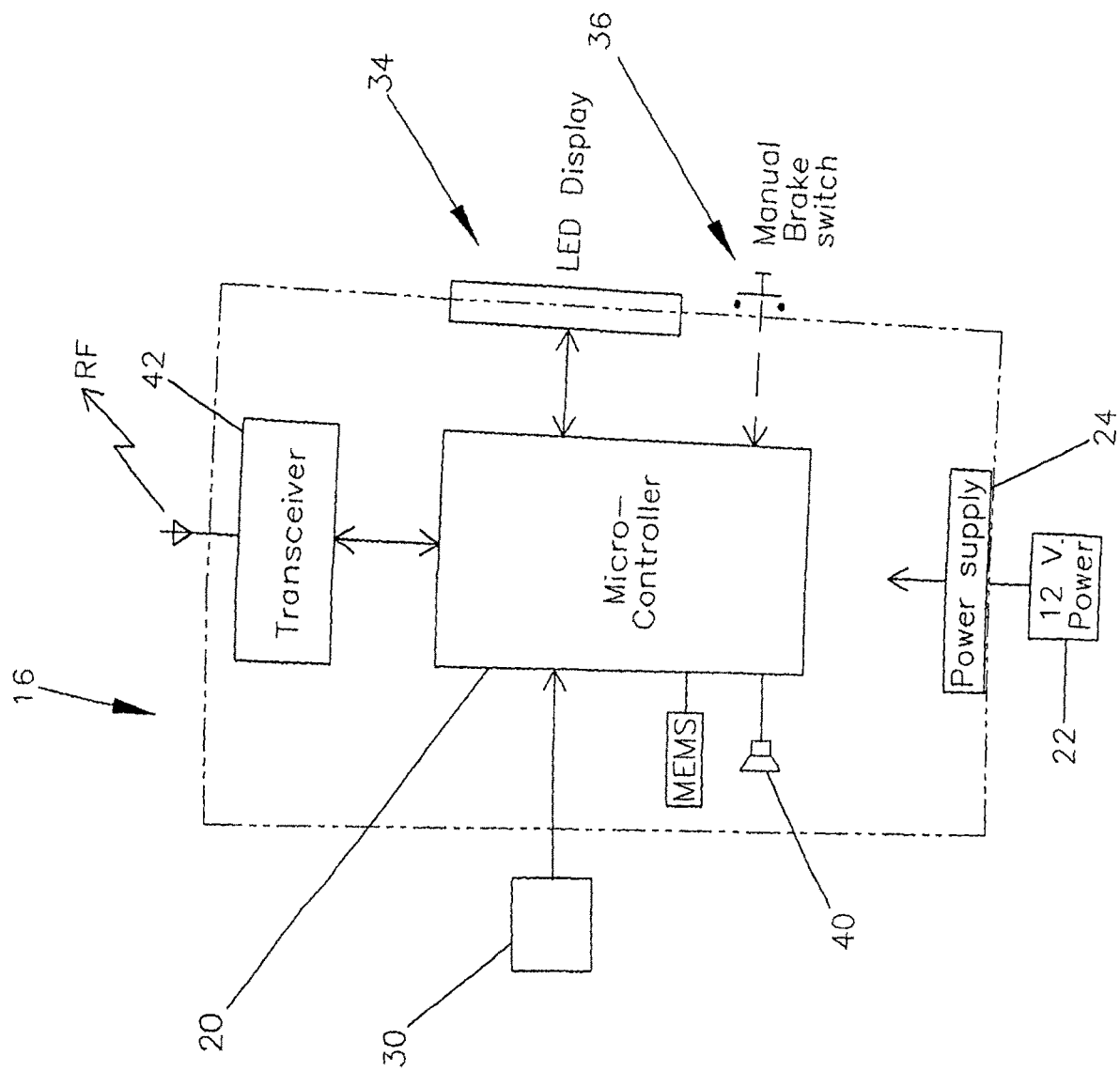
FIG. 3 is a diagram depicting the components of the module of the communication system of the present invention of the towing vehicle.

As shown in FIGS. 2 and 3, the towing vehicle module 16 comprises a microcontroller 20 coupled to an external power source 22 by a towing vehicle power supply 24 and coupled to a towing vehicle control unit 26 such as a CAN network within the towing vehicle 12 through a self-diagnostic device port 28 such as an OBDII port by a towing vehicle port connector 30 and a towing vehicle control unit interface 32 such as a CAN network interface. A control panel comprising an LED display 34 and control switches 36 is coupled to the microcontroller 20 to transmit and receive data and signals between the microcontroller 20 and the towed vehicle module 18 through a communication section 38 also coupled to the microcontroller 20.

As shown in FIG. 3, the towing vehicle module 16 also includes an alarm 40 to generate an audio and/or visual indication when a predetermined condition such as towed vehicle break-away is detected. A MEMS or other sensor is provided to generate a deceleration signal upon braking of the towing vehicle 12. FIG. 3 also depicts a transceiver 42 to transmit and receive data and signals between the towing vehicle module 16 and the towed vehicle module 18.

As shown in FIGS. 2 and 4, the towed vehicle module 18 comprises a microcontroller 44 coupled to an external power source (not shown) by a towed vehicle power supply 46 and coupled to a towed vehicle control unit 48 such as a CAN network within the towed vehicle 10 through a self-diagnostic device port 50 such as an OBDII port by a towed vehicle port connector 52 and a towed vehicle control unit interface 54 such as a CAN interface. A control panel 56 comprising a LED display or status indicators is coupled to the microcontroller 44 to transmit and receive data and signals from the microcontroller 44 through the communication section 58 to the communication section 38 of the towing vehicle module 16.

FIG. 4 also depicts a transceiver 60 to transmit data signals from the towed vehicle module 18 of the towed vehicle 10 to the transceiver 42 of the towing vehicle module 16 of the towing vehicle 12. In addition, transceiver 60 may communicate directly with cellular phones or tablet devices with communication capabilities such as Bluetooth using software applications.

As shown in FIG. 2, the hard wire cable harness 14 extending between the towing vehicle 12 and towed vehicle 10 couples the towed vehicle module 18 through a cable connector 64 and a cable connector receptacle 66 to the brake lights and brake light switch (not shown) of the towed vehicle 10 through an existing towing vehicle hook-up or connector (not shown) and the cable connector 62 of the towing vehicle 12.

A plurality of operating conditions such as the level of battery charge, tire pressure, transmission temperature, braking events and the like are individually sensed by sensors associated with each of the sub-systems being monitored. Information signals representing each of these predetermined or selected sub-systems are fed from the individual sensors (not shown) to the towed vehicle control unit 48. These information signals are then fed through the self-diagnostic port 50 to the microprocessor 44.

The microprocessor 44 includes logic and circuitry to translate or convert each individual information signal to a corresponding data signal for transmission to the towing vehicle module 16 through the tow bar and hard wire cable harness 14 or from the transceiver 60 to the transceiver 42.

Data signals transmitted or fed from the towed vehicle module 18 through the tow bar and hard wire cable harness 14 or transmitted from transceiver 60 to transceiver 42 to the towing vehicle module 16 including the microcontroller 20 having logic and circuitry to translate or convert the individual data signals to corresponding information signals representative of the individual sub-system conditions from the towed vehicle control unit 48 through the self-diagnostic device 50 and a towed vehicle port connector 52. These information signals are then fed to the LED display 34.

The data signals may be fed and displayed continuously from the towed vehicle module 18 to the towing vehicle module 16 that, in turn, may be continuously displayed on the LED display 34. Alternately, the data signals may be transmitted displayed intermittently on demand. Finally, when any of the predetermined parameters or operating conditions reaches a predetermined threshold value or metric the corresponding data signal is transmitted from the towed vehicle module 18 to the towed vehicle module 16 to be converted and displayed on the LED display 34. In addition, an alert such as an audible alarm may be sounded by the alarm or speaker 40.

As shown in FIGS. 2, 7 and 9, the brake lights or brake light switch (not shown) of the towing vehicle 12 are also connected to the brake lights and tail lights of the towed vehicle 10. In addition, the battery (not shown) of the towed vehicle 10 may be coupled to a power source (not shown) in the towing vehicle 12 such as a battery (not shown).

A braking event for the towed vehicle 10 can be initiated from the towing vehicle 12 in one of the three distinct modes described hereinafter.

The first mode of initiating a towed vehicle braking sequence is to depress the manual brake switch 36 (FIGS. 2 and 3) on the control panel of the towing vehicle module 16 to generate a brake signal fed to the microcontroller 20 that, in turn, generates a braking signal transmitted to the transceiver 60 of the towed vehicle module 18 of the towed vehicle 10 by the transceiver 42 of the of the towing vehicle module 16 of the towing vehicle 12. The braking signal received by the transceiver 60 of the towed vehicle module 18 is then fed to the microcontroller 44 of the towed vehicle module 18 which, in turn, generates a braking signal is fed through the towed vehicle control unit interface 54, towed vehicle port connector 52, automotive vehicle self-diagnostic and reporting device 50 to the towed vehicle control unit 48 to actuate the towed vehicle brake system to apply the brakes of the towed vehicle 10 completing the brake activating sequence of the existing brake system of the towed vehicle 10.

A second mode of initiating a towed vehicle braking sequence is to actuate the braking systems of the towing vehicle 12 by a applying force on the brake pedal (not shown). In particular, the signal generated from the brake light switch or brake light signal is fed to the cable connector 62 through the hard wire cable harness or link 14 and cable connector 64 to the communication section 58 of the towed vehicle module 18 through the cable connector receptacle 66. The signal is fed from the communication section 58 to the microcontroller 44 of the towed vehicle 10.

The microcontroller 44 of the towed vehicle module 18 then generates a braking control signal that is fed through the towed vehicle control unit interface 54, towed vehicle port connector 52, automotive vehicle self-diagnostic and reporting device 50 to the towed vehicle control unit 48 to actuate the towed vehicle brake system to apply the brakes of the towed vehicle 10 completing the brake activating sequence.

As shown in FIG. 2, the braking signal from the towing vehicle 12 may also be fed to the brake lights and tail lights of the towed vehicle 10 through the hard-wired cable harness or link 14 and existing wiring of the towed vehicle 10. In addition, power may be fed from the towing vehicle 12 to the towed vehicle 12 through the hard wire cable harness or link 14 to maintain voltage charge on the battery of the towed vehicle 10.

The third mode of initiating a towed vehicle braking sequence is to actuate the braking system of the towed vehicle 10 when braking of the towing vehicle 12 is sensed by a sensor such as a MEMS in the towing vehicle module 16 to generate a braking sensor signal to be transmitted to the towed vehicle 10.

In particular, the braking sensor signal is fed to the logic and circuitry of the microcontroller 20 of the towing vehicle module 16 that generates the braking signal to be fed to the towed vehicle module 18 by either the transceiver 42 of the towing module 16 to the transceiver 60 of the towed vehicle 10 or through the hard-wire cable harness or link 14. The towed vehicle module 18 then generates the braking control signal fed to the brake system of the towed vehicle 10 as previously described.

In addition, a braking event can also be initiated automatically by the towed vehicle module 18 in a manner of initiating a towed vehicle braking sequence by detecting acceleration difference over time using the microcontroller and MEMS 44. The microcontroller 44 of the towed vehicle module 18 then generates a braking control signal that is fed through the towed vehicle control unit interface 54, towed vehicle port connector 52, automotive vehicle self-diagnostic and reporting device 50 to the towed vehicle control unit 48 to actuate the towed vehicle brake system to apply the brakes of the towed vehicle 10 completing the brake activating sequence.

During active braking events microcontroller 44 generates proportional brake signals proportional to brake towed vehicle 10 to acceleration generated by towing RV or other towing vehicle 12 based on the multiple signals including the MEMS acceleration sensor in towed vehicle module 18. The towed vehicle brakes are signaled to release by the same method as brake initiation except communicating to terminate braking, upon exiting brake events.

A break-away event occurs when the towing vehicle 12 and towed vehicle 10 become mechanically disconnected. A break-away switch located by tow bar or hard wire cable harness or link 14 connected to a hook-up connector detects the break-away event. Alternately a signal is generated by the microcontroller 44 by detecting a loss of the charging connection in the tow bar or hard wire cable harness or link 14. The microcontroller 44 sequences through a break-away sequence. The microcontroller 44 of the towed vehicle module 18 then generates a braking control signal fed through the towed vehicle control unit interface 54, towed vehicle port connector 52, automotive vehicle self-diagnostic and reporting device 50 to the towed vehicle control unit 48 to actuate the towed vehicle brake system to apply the brakes of the towed vehicle 10. During break-away events the microcontroller 44 of the towed vehicle generate signals to brake at settable levels of braking force stored in the microcontroller 44 non-volatile memory in the towed vehicle module 18 along with signals to sound towed vehicle horn alarm 40 and illuminate brake lights. The towed vehicle 10 brakes force may be sequenced with high initial braking force to stop the towed vehicle 10, then folds back braking force to hold the towed vehicle 10 stationary until the break-away event is terminated and brakes are signaled to release by the same method as brake initiation except communicating to terminate braking upon exiting break-away event. During break-away events, notifications are generated and communicated by towed vehicle module 18 to alert and broadcast status to the control and display console of the towing vehicle 12.

During towing vehicle 12 or towed vehicle 10 braking events, the towed vehicle module 18 may generate towed vehicle brake light command signals by microcontroller 44 of the towed vehicle module 18 which, in turn, generates a braking light signal fed through the towed vehicle control unit interface 54, towed vehicle port connector 52, automotive vehicle self-diagnostic and reporting device 50 to the towed vehicle control unit 48 to illuminate the towed vehicle brake lights of the towed vehicle 10 to indicate a brake sequence.

General operational towed vehicle lights for example turn signals, running and back-up lights may be controlled by towing vehicle module 16 to generate a light signal fed to the microcontroller 20 that, in turn, generates a lighting signal transmitted to the transceiver 60 of the towed vehicle module 18 of the towed vehicle 10 by the transceiver 42 of the of the towing vehicle module 16 of the towing vehicle 12. The light signal received by the transceiver 60 of the towed vehicle module 18 is then fed to the microcontroller 44 of the towed vehicle module 18 which, in turn, generates a light signal fed through the towed vehicle control unit interface 54, towed vehicle port connector 52, automotive vehicle self-diagnostic and reporting device 50 to the towed vehicle control unit 48 to illuminate the towed vehicle lights of the towed vehicle.

The electronics, components, circuitry and logic of the present invention are similar to those described in nonprovisional application Ser. No. 15/932,947 filed May 25, 2018 and provisional application Ser. No. 63/100,665 filed Mar. 23, 2020 and incorporated herein by reference.

FIG. 5 is a wiring diagram of the towed vehicle 10 is connected to the towing vehicle 12 by the hardwired cable harness or link 14.

FIG. 6 is a block diagram of the various circuit components of the communication system of the towed vehicle module 18 of the present invention.

FIG. 7 is a schematic diagram of the microcontroller circuitry and associated peripheral circuitry of the towed vehicle module 18.

FIG. 8 is a schematic diagram of the vehicle control unit interface circuitry of the interface connected to the microcontroller, power management and hook-up connector of the towed vehicle module 18.

FIG. 9 is a schematic diagram of the hook-up connector circuitry connected to the power management to provide signals through interface circuitry for microcontroller to process the various states of operation of the towed vehicle module 18.

FIG. 10 is a schematic diagram of the power management circuitry connected to the microcontroller, interface, hook-up connector and Bluetooth to provide power to the individual circuit components.

FIG. 11 is a schematic diagram of the Bluetooth circuitry connected to the microcontroller and power management of the towed vehicle module 18.

FIG. 12 is a top view of the printed circuit board depicting the actuated circuit components implementing the electronics of the towed vehicle module 18.

FIG. 13 is a brake state diagram showing the operational status of the communication system of the present invention.

FIG. 14 is a brake flow chart depicting the logic sequence of the communication system of the present invention.

Once power is provided to the towed vehicle 10, the microcontroller 44 configures all inputs, outputs, initial values and conditions.

When the towed vehicle module 18 is initialized, the electronically controlled braking system is placed in standby not-in-tow state. This reduces electrical power to the lowest amount to prevent discharging the towed vehicle 10 battery. Only in-tow detection circuitry is powered and processed by microcontroller 44 to qualify connection to a towing RV or other towing vehicle 12.

Diagnostics are processed by microcontroller 44 of the towed vehicle 10 to determine proper and safe operation of the tow brake system 10. Diagnostic functions include proper and safe operation of the tow brake system 10. Diagnostic functions include computer-operating-properly timer or watch-dog timer time-out allowable combinations of inputs and outputs including towed vehicle 10 stop light signal on when electronically controlled tow brake system is not braking or actuated, sensor measurements in acceptable ranges, sequence time outs, predetermined rules, combinational and state variables or any other items effecting the normal and safe operation of electronically controlled tow brake system.

Qualified-in-tow connection of towed vehicle 10 coupled to towing RV or other towing vehicle 12 is determined by communication system microcontroller 44 processing multiple signals of hook-up connector signals, internal interface signals and microcontroller memory over predetermined periods of time.

In-tow idle state entered by qualified in-tow connection, the electronically controlled tow brake system powers up and processes interface circuitry and MEMS acceleration sensor with microcontroller 44 to determine and qualify a supplemental braking event or a disconnection. Status information is broadcasted to the control and display console in the RV or towing vehicle 12.

Braking events are determined by the electronically controlled tow brake system when the microcontroller 44 selectively processes any combination of multiple signals including control and display console command, hook-up connector signals, interface signals, MEMS accelerometer, microcontroller 44 memory variables along with timing requirements over predetermined periods of time to qualify braking event. Hook-up connector signals used to determine braking events may include simultaneous left and right turn/brake light signals, loss of charge line signal or a brake control signal from a remote brake controller (not shown). Interface signals used to determine braking event may include break-away signal. MEMS acceleration sensor may be used solely or in conjunction with other signals to qualify a braking event.

Braking event state entered by qualified brake event detection by microcontroller 44 repeatedly analyzes multiple signals including control and display console command, hook-up connector signals, interface signals, MEMS accelerometer, microcontroller, memory variables and timing to perform proportional braking or exit active braking state to diagnostic fault, break-away or end or braking event. During active braking events microcontroller 44 generates proportional brake signals proportional to brake towed vehicle 10 to acceleration generated by towing RV or other towing vehicle 12 based on the multiple signals including the MEMS acceleration sensor on the PCB.

Break-away event state entered by break-away detection using a break away switch located by tow bar connector harness 14 connected to hook-up connector or a generated signal by microcontroller 44 detecting a loss of the charging connection in the tow bar connector harness 14. Microcontroller 44 sequence through multiple break-away phases including break-away event notifications to alert and broadcast to the control and display console.

The towed vehicle brakes are released upon exiting brake events.

Fault may be processed by the detection signals the microcontroller 44 to perform a management sequence, reinitialization of microcontroller 44 and user indication on brake unit as well as with control and display console.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

In describing the invention, certain terms are used for brevity, clarity, and understanding. No unnecessary limitations should be inferred beyond the requirement of the prior art because such terms are used for descriptive purposes and are intended to be broadly construed. The different structural and functional elements, apparatuses, devices, compositions, and methods described herein may be used alone or in combination with other structural and functional elements, apparatuses, devices, compositions, systems and methods. It is to be expected that various equivalents, alternatives and modifications are possible.

What is claimed is:

1. A communication system to transfer data from a towed vehicle to a towing vehicle wherein data is transmitted from the towed vehicle to the towing vehicle of any of a plurality of operating conditions of selected parameters sensed by a vehicle self-diagnostic device of the towed vehicle, said selected parameters include a deceleration signal generated autonomously by a vehicle module including an acceleration sensor to sense acceleration of the towed vehicle fed to a microcontroller having logic and circuitry to initiate a towed vehicle braking sequence in response to said deceleration signal to electronically actuate the towed vehicle brakes and to generate a towed vehicle brake signal fed to the towing vehicle.

2. The communication system to transfer data from a towed vehicle to a towing vehicle to a towed vehicle of claim 1 wherein the data sensed is transferred to the towing vehicle over a tow bar and a hard wire cable harness.

3. The communication system to transfer data from a towed vehicle to a towing vehicle to a towed vehicle of claim 1 wherein data is transferred through radio frequency transmission from a towed vehicle module in the towed vehicle to a towing vehicle module in the towing vehicle.

4. The communication system to transfer data from a towed vehicle to a towing vehicle of claim 3 wherein said towing vehicle module comprises a microcontroller coupled to a towing vehicle control unit through a self-diagnostic device port and a towing vehicle control unit interface and said towed vehicle module comprises a microcontroller coupled to a towed vehicle control unit through a self-diagnostic port and a towed vehicle control unit interface.

5. The communication system to transfer data from a towed vehicle to a towing vehicle of claim 4 wherein said towing vehicle control unit comprises a CAN network and said towed vehicle control unit comprises a CAN network.

6. The communication system to transfer data from a towed vehicle to a towing vehicle towed vehicle of claim 5 wherein said towing vehicle self-diagnostic device port comprises an OBDII port and said towed vehicle self-diagnostic device port comprises or OBDII port.

7. The communication system to transfer data from a towed vehicle to a towing vehicle of claim 6 towing vehicle module is coupled to said towing vehicle control unit by a towing vehicle port connector and a towing vehicle control unit interface and said towed vehicle towed vehicle module is coupled to said towed vehicle control unit by a towed vehicle port connector and a towed vehicle control unit interface.

8. The communication system to transfer data from a towed vehicle to a towing vehicle of claim 7 wherein said towing vehicle control unit interface comprises a CAN network interface and said towed vehicle control unit interface comprises a CAN network interface.

9. The communication system to transfer data from a towed vehicle to a towing vehicle of claim 6 further including a control panel comprising a visual display and controls coupled to said microcontroller to transmit and receive data between said towing vehicle module and said towed vehicle module.

10. The communication system to transfer data from a towed vehicle to a towing vehicle to a towed vehicle of claim 9 wherein said towing vehicle module further includes logic to generate an audio and/or visual indication when a predetermined operating condition is detected in the towed vehicle.

11. The communication system to transfer data from a towed vehicle to a towing vehicle of claim 10 wherein a control panel comprising a visual display or status indicator is coupled to said microcontroller of said towing vehicle module to transmit and receive data from said microcontroller of said towing vehicle module through a towing vehicle communication section to a communication section in said towing vehicle module.

12. The communication system to transfer data from a towed vehicle to a towing vehicle of claim 11 wherein a transceiver transmits data from said towed vehicle module to said transceiver towing vehicle module.

13. The communication system to transfer data from a towed vehicle to a towing vehicle of claim 12 wherein at least one of a plurality of operating conditions such as the level of battery charge, tire pressure, transmission temperature, and braking events are individually sensed by sensors associated with each of the sub-systems is monitored such as information signals representing each predetermined or selected sub-systems fed from said individual sensors to the towed vehicle control unit and transmitted to said towing vehicle module for display.

14. The communication system to transfer data from a towed vehicle to a towing vehicle of claim 13 wherein said microprocessor of said towed vehicle module includes logic and circuitry to translate or convert each individual information signal to a corresponding data for transmission to said towing vehicle module by said transceivers.

15. The communication system to transfer data from a towed vehicle to a towing vehicle of claim 14 wherein the data are fed continuously from said towed vehicle module to said towing vehicle module continuously displayed on said display.

16. The communication system to transfer data from a towed vehicle to a towing vehicle of claim 14 wherein data is transmitted and displayed intermittently on demand.

17. The communication system to transfer data from a towed vehicle to a towing vehicle of claim 1 wherein upon receiving said threshold signal an alert said towing vehicle module generates an alarm.

18. The communication system to transfer data from a towed vehicle to a towing vehicle of claim 1 wherein whenever any of said predetermined parameters other than said deceleration reaches a predetermined threshold value a signal corresponding to that condition is transmitted from the towed vehicle to the towing vehicle and displayed.

* * * * *